(12) United States Patent
Mastroianni

(10) Patent No.: US 7,975,396 B2
(45) Date of Patent: Jul. 12, 2011

(54) METHODS AND APPARATUS FOR CUTTING BAKED GOODS

(76) Inventor: Jeffrey Scott Mastroianni, Shiloh, IL (US)

( * ) Notice: Subject to any disclaimer, the term of this patent is extended or adjusted under 35 U.S.C. 154(b) by 0 days.

(21) Appl. No.: 11/180,359

(22) Filed: Jul. 13, 2005

(65) Prior Publication Data

US 2007/0011900 A1 Jan. 18, 2007

(51) Int. Cl.
*G01B 3/14* (2006.01)
(52) U.S. Cl. ......................................... 33/566; 33/305
(58) Field of Classification Search .................. 33/566, 33/533, 1 F, 524–525; D7/672–673, 408, D7/553.6; 83/761, 404, 620, 404.1; 30/283, 30/277, 303–305; 99/430
See application file for complete search history.

(56) References Cited

U.S. PATENT DOCUMENTS

| | | | |
|---|---|---|---|
| 892,552 A | 7/1908 | Rexer | |
| 1,175,512 A * | 3/1916 | Flemal | 30/172 |
| 1,463,941 A * | 8/1923 | Cusimano | 30/303 |
| 2,089,396 A * | 8/1937 | Meilstrup | 426/499 |
| D132,314 S * | 5/1942 | Melville | D7/354 |
| 2,434,566 A | 1/1948 | Hulsmann | |
| D154,071 S * | 6/1949 | Smith | D7/673 |
| 2,487,234 A | 11/1949 | Gore | |
| 3,075,565 A * | 1/1963 | Weaver et al. | 33/525 |
| 3,132,678 A * | 5/1964 | Steketee | 83/765 |
| 3,302,591 A * | 2/1967 | Schmidt | 30/303 |
| 3,727,508 A | 4/1973 | Haapala | |
| D246,411 S * | 11/1977 | Blanchard | D7/673 |
| 4,100,676 A * | 7/1978 | Ferguson | 30/292 |
| 4,408,397 A * | 10/1983 | Bartos | 33/524 |
| 4,424,601 A | 1/1984 | Weber | |
| 4,648,300 A | 3/1987 | Hassenfelt, Jr. | |
| D316,655 S | 5/1991 | Buday | |
| 5,036,740 A | 8/1991 | Tsai | |
| D358,969 S * | 6/1995 | Romanoff | D7/672 |
| 5,597,113 A * | 1/1997 | Bradford | 229/120.36 |
| D393,184 S * | 4/1998 | Chambers | D7/673 |
| 5,864,909 A | 2/1999 | Liu | |
| D409,054 S * | 5/1999 | Wirfel | D7/673 |
| 6,009,786 A | 1/2000 | Hjelden | |
| 6,123,972 A * | 9/2000 | Matthews et al. | 426/518 |
| 6,182,549 B1 | 2/2001 | Albright et al. | |
| D446,088 S * | 8/2001 | Pardee | D7/673 |
| 6,276,918 B1 * | 8/2001 | Slaughter et al. | 425/289 |
| 6,557,260 B1 * | 5/2003 | Morris | 30/114 |
| 6,745,660 B2 * | 6/2004 | Caputo | 83/761 |
| 2004/0250667 A1 * | 12/2004 | Atwater | 83/13 |
| 2006/0272162 A1 * | 12/2006 | Atwater et al. | 30/303 |
| 2007/0011900 A1 * | 1/2007 | Mastroianni | 33/566 |
| 2010/0043239 A1 * | 2/2010 | Pittman | 30/305 |

* cited by examiner

*Primary Examiner* — Yaritza Guadalupe-McCall
(74) *Attorney, Agent, or Firm* — Armstrong Teasdale LLP

(57) ABSTRACT

A template for use in cutting a good contained in a pan enables the baked good to be cut into a plurality of substantially equi-sized pieces. The template includes a substantially planar body including a plurality of first slots and a plurality of second slots. The plurality of first slots are substantially parallel and are spaced approximately equi-distantly across the body. The plurality of second slots are substantially parallel and are oriented obliquely with respect to the plurality of first slots.

19 Claims, 3 Drawing Sheets

METHODS AND APPARATUS FOR CUTTING BAKED GOODS

BACKGROUND OF THE INVENTION

This invention relates generally to cutting templates, and more particularly, to cutting templates used to cut goods contained in a pan during baking.

The art of cooking has grown to epic proportions and is continuing to grow in popularity, as evidenced by, for example, the growing number of television programs dedicated to cooking, and the steady annual increase of cook book and kitchen ware sales. At least some of the known cook books and television programs also provide, and emphasize, the history surrounding the food being prepared.

For example, the pastry baklava is rumored to have been originally created in approximately the 8th century B.C. Traditionally, baklava was only baked on special occasions and was considered a food for consumption only by the wealthy. Overtime, the notion that only the wealthy could afford to eat the rich pastry has changed, and it can be enjoyed by everyone all year long. However, one custom that has not changed with respect to the baklava is the tradition of cutting the Baklava into diamond-shaped pastries. To accomplish such a feat, a plurality of cuts must be made in two directions relative to the pan containing the baked pastry. However, because the cuts are not parallel to the sidewalls of the pan, but instead are oblique relative to the sidewalls of the pan, at least some known cook books describe that cutting the Baklava into diamond-shaped portions that are approximately equi-sized may be difficult.

To facilitate cutting baked goods into equi-sized portions, at least some known cake pans include a series of guide pins that extend upwardly from an outer periphery of the pan. A straight edge is held firmly against the pins while a cutting utensil is guided through the baked goods along the straight edge. The straight edge is then moved to a new pin location, and the process is repeated many times until the baked good is cut into the desired shape. Although the pins and straight edge facilitate the baked goods being cut into desired shapes, depending on the shape of the pan, such cutting pins may not be practical to use, and may be time-consuming.

BRIEF DESCRIPTION OF THE INVENTION

In one aspect, a template for use in cutting a good contained in a pan is provided. The template includes a substantially planar body including a plurality of first slots and a plurality of second slots. The plurality of first slots are substantially parallel and are spaced approximately equi-distantly across said body. The plurality of second slots are substantially parallel and are oriented obliquely with respect to the plurality of first slots.

In another aspect, an apparatus for use in cutting a baked good is provided. The apparatus includes a pan and a cutting template. The pan includes a continuous sidewall including an upper edge and a bottom surface. The sidewall extends upward from the bottom surface to the upper edge such that a cavity is defined by the sidewall and the bottom surface. The cavity is sized to substantially contain the baked good therein. The cutting template includes a plurality of first slots and a plurality of second slots. The plurality of first slots are substantially parallel and are spaced approximately equi-distantly across the body. The plurality of second slots are substantially parallel and are oriented obliquely with respect to the plurality of first slots.

DETAILED DESCRIPTION OF THE INVENTION

Figure 1:
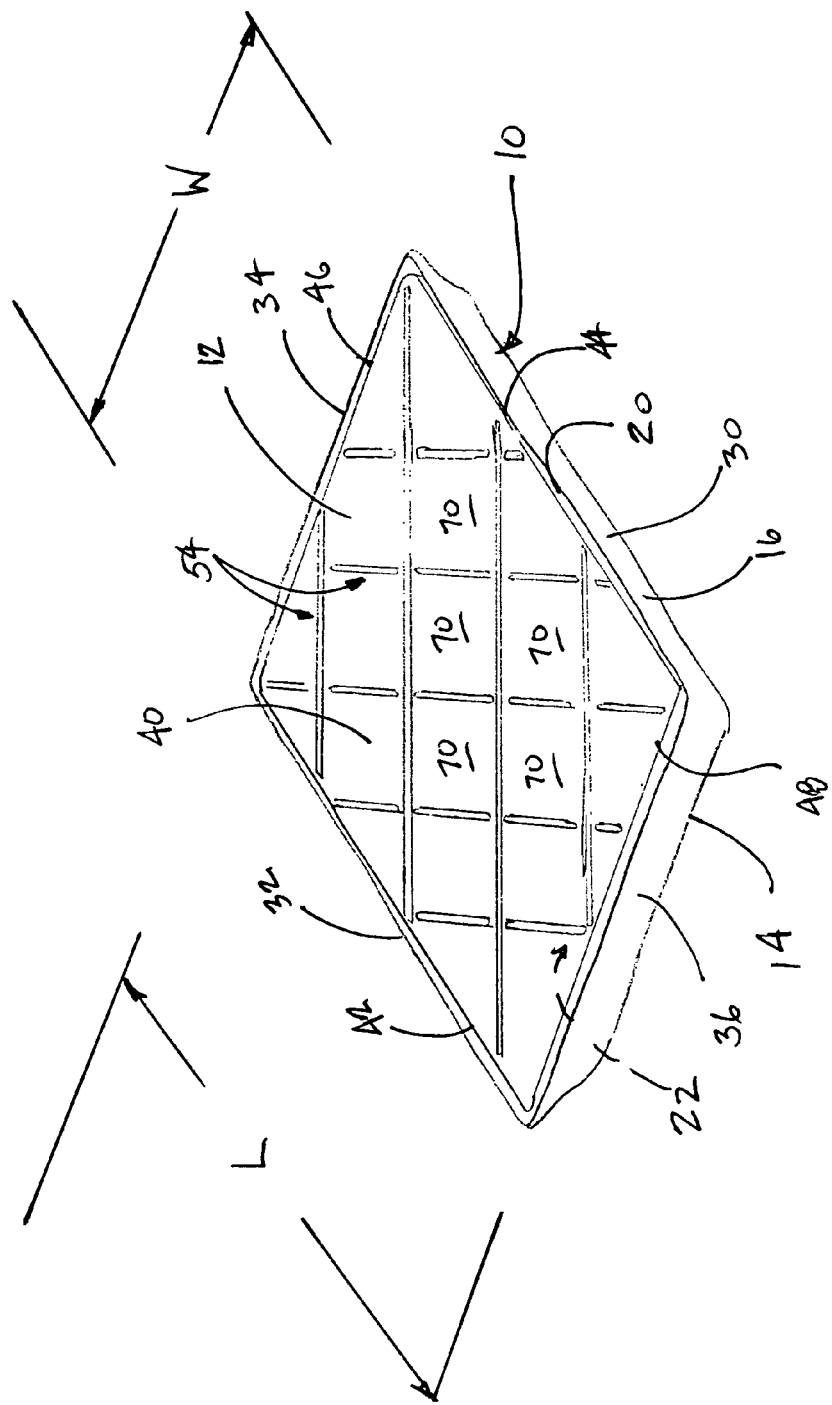
FIG. 1 is a perspective view of a baking pan including an exemplary embodiment of a cutting template.
Figure 2:
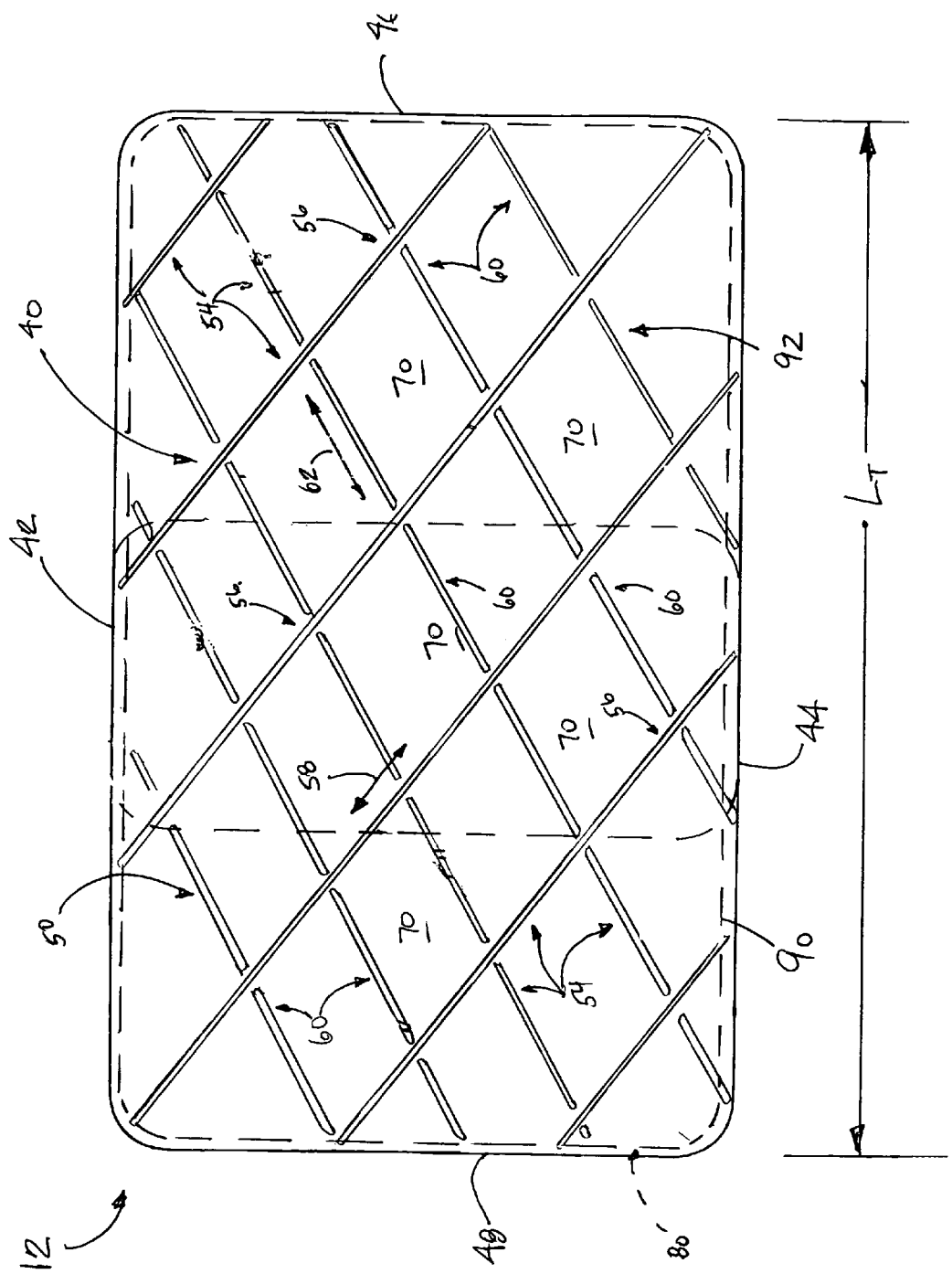
FIG. 2 is a plan view of an alternative embodiment of a cutting template that may be used with the baking pan shown in FIG. 1.
Figure 3:
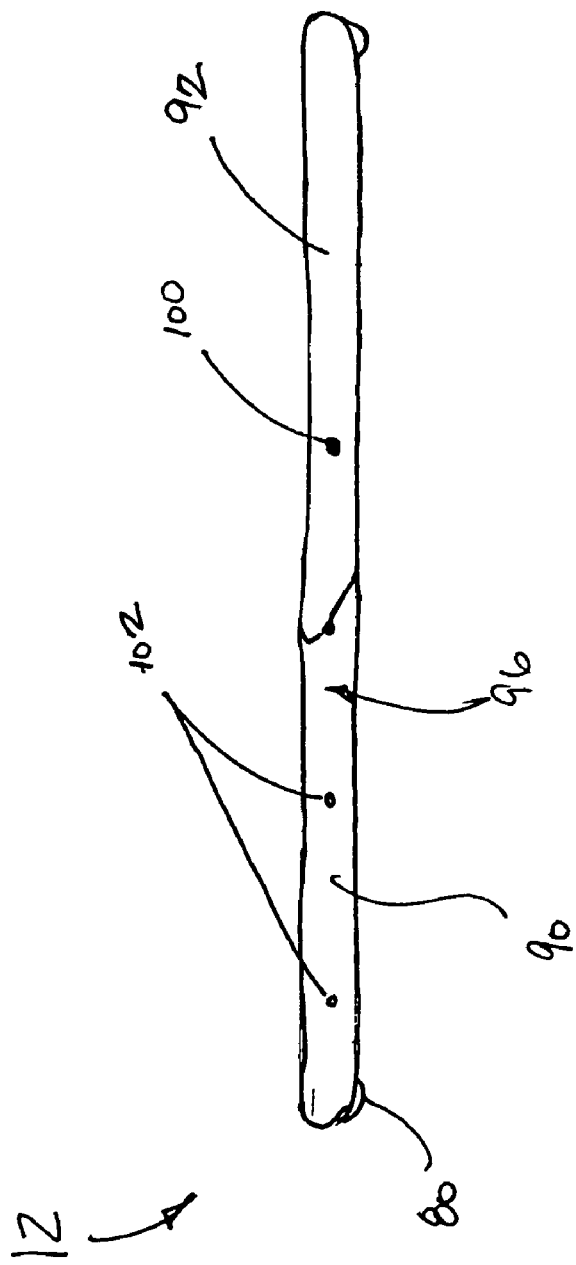
FIG. 3 is an enlarged side view of the cutting template shown in FIG. 2.

FIG. 1 is a perspective view of a baking pan 10 including an exemplary embodiment of a cutting template 12. FIG. 2 is a plan view of an alternative embodiment of an exemplary cutting template 12. FIG. 3 is an enlarged side view of an exemplary cutting template 12. Pan 10 includes a pan bottom 14 and a continuous sidewall 16 that circumscribes bottom 14 and extends upwardly therefrom. More specifically, sidewall 16 extends from pan bottom 14 to an upper edge 20, such that a cavity 22 is defined by sidewall 16 and pan bottom 14. Pan cavity 22 is sized to contain a good baked therein, including but not limited to pastries such as baklava.

Baking pan 10 is intended as exemplary only, and thus is not intended to limit in any way the definition and/or meaning of the term "pan". It should also be noted that other cooking vessels other than pan 10 could be used in conjunction with the invention described herein, without limiting the invention. Furthermore, although the invention is described herein in association with baked goods, and more specifically for use with baklava, it should be understood that the present invention is applicable to other cooking methods, as well as for use with other baked goods. Accordingly, practice of the present invention is not limited for use with pans containing baked goods, such as baklava.

In the exemplary embodiment, pan 10 includes a first pair of opposing sides 30 and 32 that are coupled together by a second pair of opposing sides 34 and 36. In the exemplary embodiment, pan sides 30 and 32 are substantially parallel, and sides 34 and 36 are substantially parallel, such that pan 10 is substantially rectangular. In alternative embodiments, pan 10 is non-rectangular. Pan 10 has a width W defined between sides 30 and 32, and a length L defined between sides 34 and 36.

In the exemplary embodiment, cutting template 12 is substantially planar and includes a body 40 that is bounded by a first pair of opposing edges 42 and 44 that are connected together by a second pair of opposing edges 46 and 48. In the exemplary embodiment, template edges 42 and 44 are substantially parallel, and edges 46 and 48 are substantially parallel, such that cutting template 12 is substantially rectangular. In alternative embodiments, cutting template 12 is non-rectangular. Cutting template 12 has a width $W_T$ defined between sides 42 and 44, and a length $L_T$ defined between sides 46 and 48. In the embodiment shown in FIG. 1, cutting template width $W_T$ is narrower than pan width W and cutting template length $L_T$ is shorter than pan length L such that cutting template 12 is sized to be received within the portion of pan cavity 22 defined by sidewall upper edge 20. Alternatively, cutting template 12 may be sized larger than cavity 22 and as such may span across sidewalls 34 and 36 or sidewalls 30 and 32, or overhang any of sidewalls 30, 32, 34, or 36. In a further alternative embodiment, cutting template 12 is hingedly coupled to pan 10.

Cutting template 12 includes a substantially planar upper surface 50, a substantially planar lower surface 52 that is opposite upper surface 50, and a plurality of cutting guides 54 extending therebetween. More specifically, in the exemplary embodiment, cutting guides 54 include a plurality of first guide slots 56 which are substantially parallel and are oriented in a first direction (indicated by arrow 58) relative to pan 10, and a plurality of second guide slots 60 which are substantially parallel and are oriented in a second direction (indicated by arrow 62) relative to pan 10. In the exemplary embodiment, slots 56 are equi-spaced across template body 40. Alternatively, slots 56 are extend across template body 40 but are not equi-spaced.

In the exemplary embodiment, each guide 54 is substantially oval-shaped. Alternatively, cutting template 12 may not include oval-shaped guides 54, but rather may include guides 54 which are not oval-shaped and which enable template 12 to function as described herein, such as, but not limited to, X-shaped cutting guides. In one embodiment, cutting template 12 includes a flange (not shown) that extends downwardly from template lower surface 52 and is configured to be inserted within pan cavity 22 and positioned against at least a portion of an inner surface of sidewall 16. Guides 54, as described in more detail below, enable a cutting utensil, such as, but not limited to a knife, to traverse the goods contained in pan 10 to form substantially diamond-shaped portions or pastries. In one embodiment, guides 54 are circumscribed by a hardened material, such as a metal strip, that facilitates increasing the hardness of template 12 in areas defining guides 54 and thus facilitates preventing the cutting utensil from inadvertently damaging the template 12.

In the exemplary embodiment, slots 56 and 60 are oriented obliquely with respect to template edges 42, 44, 46, and 48, and also with respect to pan sides 30, 32, 34, and 36. Alternatively, slots 56 and 60 are defined at other orientations. More specifically, in the exemplary embodiment, slots 60 are oriented obliquely with respect to slots 56 such that adjacent pairs of slots 60 and adjacent pairs of slots 56 define substantially diamond-shaped areas 70. Accordingly, as described in more detail below, in the exemplary embodiment, template 12 is configured to assist a user in cutting a good contained in pan 10 into diamond-shaped portions that are approximately equi-sized. In other embodiments, slots 56 and 60 are oriented to define non-diamond shaped areas, such as but not limited to, substantially square-shaped areas. In yet other embodiments, slots 56 and 60 are oriented to define diamond-shaped areas having a cross-sectional area that is larger or smaller than the cross-sectional areas illustrated in the Figures.

Cutting template 12 includes an engagement rim 80 that circumscribes template body 40. More specifically, in the exemplary embodiment, rim 80 extends outwardly from template lower surface 52 and facilitates enhancing the structural stability and rigidity of cutting template 12. In some embodiments, depending on the size of pan 10, rim 80 enables cutting template 12 to frictionally engage pan upper edge 20 such that template 12 is securely coupled to pan 10. In the exemplary embodiment, when cutting template 12 is received within the portion of pan cavity 22 defined by sidewall upper edge 20, rim 80 rests against the good contained in pan 10 and being cut.

In the exemplary embodiment, cutting template 12 includes a first body portion 90 and a second body portion 92. Second body portion 92 is slidably coupled to first body portion 90 and is moveable in a lengthwise direction relative to first body portion 90. In an alternative embodiment, template 12 also includes, or in the alternative includes, a body portion that is moveable in a widthwise direction. More specifically, template body portion 90 includes an adjustment mechanism 96 that facilitates coupling body portion 92 to body portion 90 in pre-determined locations relative to body portion 90. As such, adjustment mechanism 96 facilitates ensuring that the relative spacing and orientation of slots 54 within template body 40 is maintained regardless of the relative position of portion 92 with respect to portion 90.

In the exemplary embodiment, adjustment mechanism 96 includes a retaining pin 100 and a series of openings 102. Pin 100 extends radially inward from body portion 92 and provides a stop for variably positioning portion 92 with respect to portion 90. More specifically, pin 100 is received within any of openings 102 formed within portion 90.

During use, if necessary, initially body portion 92 is moved relative to body portion 90 until the template 12 is sized to extend over substantially most, if not all, of the goods contained within pan 10. In one embodiment, when template 12 is determined to have the dimensions necessary to cut the good contained in the pan, then the template 12 is forced downward on the sidewall upper edge 20 until the template rim 80 engages the upper edge 20 and template 12 is coupled to pan 10. Alternatively, template 12 may be sized to be received within cavity 22, or sized to span or extend over at least a portion of pan sidewall 16.

Once template 12 is positioned relative to pan 10, a cutting utensil may be inserted through a respective template guide slot 56 or 60 for cutting a portion of the goods contained therein. After the cutting utensil has transferred the slot, the utensil is moved to a new slot and the process is completed until the goods contained in the pan 10 have been formed into a plurality of substantially diamond shaped portions that are approximately equi-sized.

The above-described pan provides a user with a template that facilitates enabling the user to cut a plurality of diamond-shaped portions that are sized approximately the same. More specifically, the cutting template include a plurality of cutting slots that are positioned to enable traditional diamond-shaped portions to be made. As a result, baking times for baklava pastries in a cost-effective and reliable manner.

Exemplary embodiments of pans and cutting templates are described above in detail. Although the cutting templates are herein described and illustrated in association with cooking pans, it should be understood that the present invention may be used to create different shaped portions in association with different pans and different goods. Moreover, it should also be noted that the components of each cutting template are not limited to the specific embodiments described herein, but rather, aspects of each template, pan, or baking method may be utilized independently and separately from other methods described herein.

While the invention has been described in terms of various specific embodiments, those skilled in the art will recognize that the invention can be practiced with modification within the spirit and scope of the claims.

What is claimed is:

1. A template for use in cutting a good contained in a pan, said template comprises a substantially planar body comprising a plurality of first slots and a plurality of second slots, said plurality of first slots are substantially parallel and are spaced approximately equi-distantly across said body when said template is positioned adjacent to and above the pan to cut the good contained in the pan, said plurality of second slots are oriented obliquely with respect to said plurality of first slots when said template is positioned adjacent to and above the pan to enable the good contained in the pan to be cut while in the pan, said body has a length measured between a first pair of opposed edges and a width measured between a second pair of opposed edges, said body comprises a first portion and a second portion that is slidably coupled to said first portion such that said plurality of first slots in said second portion move and remain substantially parallel to said plurality of first slots in said first portion as only said second portion is moved relative to said first portion.

2. A template in accordance with claim 1 further comprising a plurality of diamond-shaped areas, each of said plurality of diamond-shaped area are bounded by an adjacent pair of said plurality of first slots and an adjacent pair of said second slots.

3. A template in accordance with claim 1 wherein said body is substantially rectangular-shaped.

4. A template in accordance with claim 1 wherein said plurality of first slots extend obliquely across said body with respect to said first pair of opposed edges and said second pair of opposed edges.

5. A template in accordance with claim 1 wherein said second portion is movable with respect to said first portion in at least one of a lengthwise direction and a widthwise direction, wherein an angle defined between one of said plurality of first slots and one of said plurality of second slots varies as said second portion is moved relative to said first portion.

6. A template in accordance with claim 1 wherein said template is configured to interlock said second portion to said first portion at a plurality of pre-determined locations.

7. A template in accordance with claim 1 wherein said template body comprises an upper surface, an opposite lower surface, and a rim circumscribing said body and extending outward from at least one of said upper surface and said lower surface.

8. A template in accordance with claim 7 wherein said rim is configured to couple said template to the pan.

9. A template in accordance with claim 1 wherein said template body comprises an upper surface, an opposite lower surface, and a flange extending outward from said body lower surface, said flange sized for insertion into the pan.

10. Apparatus for use in cutting a baked good, said apparatus comprising:
 a pan comprising a continuous sidewall comprising an upper edge and a bottom surface, said sidewall extending upward from said bottom surface to said upper edge such that a cavity is defined by said sidewall and said bottom surface, said cavity sized to substantially contain the baked good therein; and
 a cutting template comprising a plurality of first slots and a plurality of second slots, said plurality of first slots are substantially parallel and are spaced approximately equi-distantly across said template when said cutting template is in position to cut the baked good while the good is in the pan, said plurality of second slots are substantially parallel and are oriented obliquely with respect to said plurality of first slots when said template is in position to enable the baked good to be cut, said cutting template further comprises a first portion and a second portion that is slidably coupled to said first portion such that said plurality of first slots in said second portion move and remain substantially parallel to said plurality of first slots in said first portion as said second portion is moved with respect to said first portion.

11. Apparatus in accordance with claim 10 wherein said cutting template comprises a first pair of opposed edges and a second pair of opposed edges extending between said first pair of opposed edges, said plurality of first slots extend obliquely with respect to said first pair of opposed edges and said second pair of opposed edges.

12. Apparatus in accordance with claim 10 wherein said pan is substantially rectangular-shaped, said cutting template is substantially rectangular-shaped and is sized to be received within said cavity.

13. Apparatus in accordance with claim 10 wherein said pan is substantially rectangular-shaped.

14. Apparatus in accordance with claim 13 wherein said cutting template second portion is movable with respect to said first portion in at least one of a lengthwise direction and a widthwise direction, wherein an angle defined between one of said plurality of first slots and one of said plurality of second slots varies as said second portion is moved relative to said first portion.

15. Apparatus in accordance with claim 10 wherein said second portion is configured to interlock to said first portion at pre-determined locations relative to said first portion.

16. Apparatus in accordance with claim 10 wherein said cutting template comprises an upper surface, an opposite lower surface, and a rim circumscribing said body.

17. Apparatus in accordance with claim 16 wherein said rim is configured to couple said cutting template to said pan sidewall upper edge.

18. Apparatus in accordance with claim 10 wherein said cutting template comprises an upper surface, an opposite lower surface, and a flange extending outward from said body lower surface, said flange sized for insertion into said pan cavity against an inner surface of said sidewall.

19. Apparatus in accordance with claim 10 wherein said pan is substantially rectangular-shaped, said cutting template is substantially rectangular-shaped and comprises a length and a width, at least one of said cutting template length and width is longer than a respective length and width of said pan.

\* \* \* \* \*